United States Patent [19]

Halpern et al.

[11] Patent Number: 4,601,046

[45] Date of Patent: Jul. 15, 1986

[54] SYSTEM FOR TRANSMITTING DATA THROUGH A TROPOSCATTER MEDIUM

[76] Inventors: Peter H. Halpern, 118 Old Hickory Ct., Longwood, Fla. 32750; Peter E. Mallory, 406 N. Riverside Dr., Edgewater, Fla. 32032; Paul E. Haug, 5851 Michelle La., Sanford, Fla. 32771; William M. Koos, Jr., 548 Lake Ave., Altamonte Springs, Fla. 32701

[21] Appl. No.: 610,572

[22] Filed: May 15, 1984

[51] Int. Cl.⁴ .......................................... H04L 27/26
[52] U.S. Cl. ...................................... 375/38; 375/40; 375/96; 375/100; 375/102; 329/135; 332/17; 332/23 R
[58] Field of Search ...................... 375/38, 39, 40, 60, 375/67, 86, 94, 96, 100; 329/120, 135; 332/17, 22, 23 R

[56] References Cited

U.S. PATENT DOCUMENTS

| | | | |
|---|---|---|---|
| 3,955,141 | 5/1976 | Lyon et al. | 375/39 |
| 3,993,956 | 11/1976 | Gilmore et al. | 329/120 |
| 4,528,674 | 7/1985 | Sweeney et al. | 375/96 |

Primary Examiner—Benedict V. Safourek
Assistant Examiner—Raymond C. Glenny
Attorney, Agent, or Firm—Laubscher & Laubscher

[57] ABSTRACT

A method of transmitting binary data from one station to another via a troposcatter medium, characterized in that the data is converted to parallel form so that the bits produce distinctive pairs of sine and cosine harmonics having different frequencies, which harmonics are summed in two separated channels that are modulated by rf sine and cosine modulating signals that are combined and transmitted to the receiver, together with a test signal that was periodically inserted in the parallel bits. The receiver supplies the signals to banks of matched filters that produce a first set of signal estimates from which the test signal is detected. A matrix system responsive to the test signal produces from the first set of estimates a second set of signal estimates having lower distortion than the first set. When the system is provided with diversity signal transmission at a different rf frequency, the test signal at the receiver is used to provide weighted diversity channel signals that are summed to provide third signal estimates having less distortion than the second set of estimates.

12 Claims, 5 Drawing Figures

System Diagram of Encoder and Transmitter

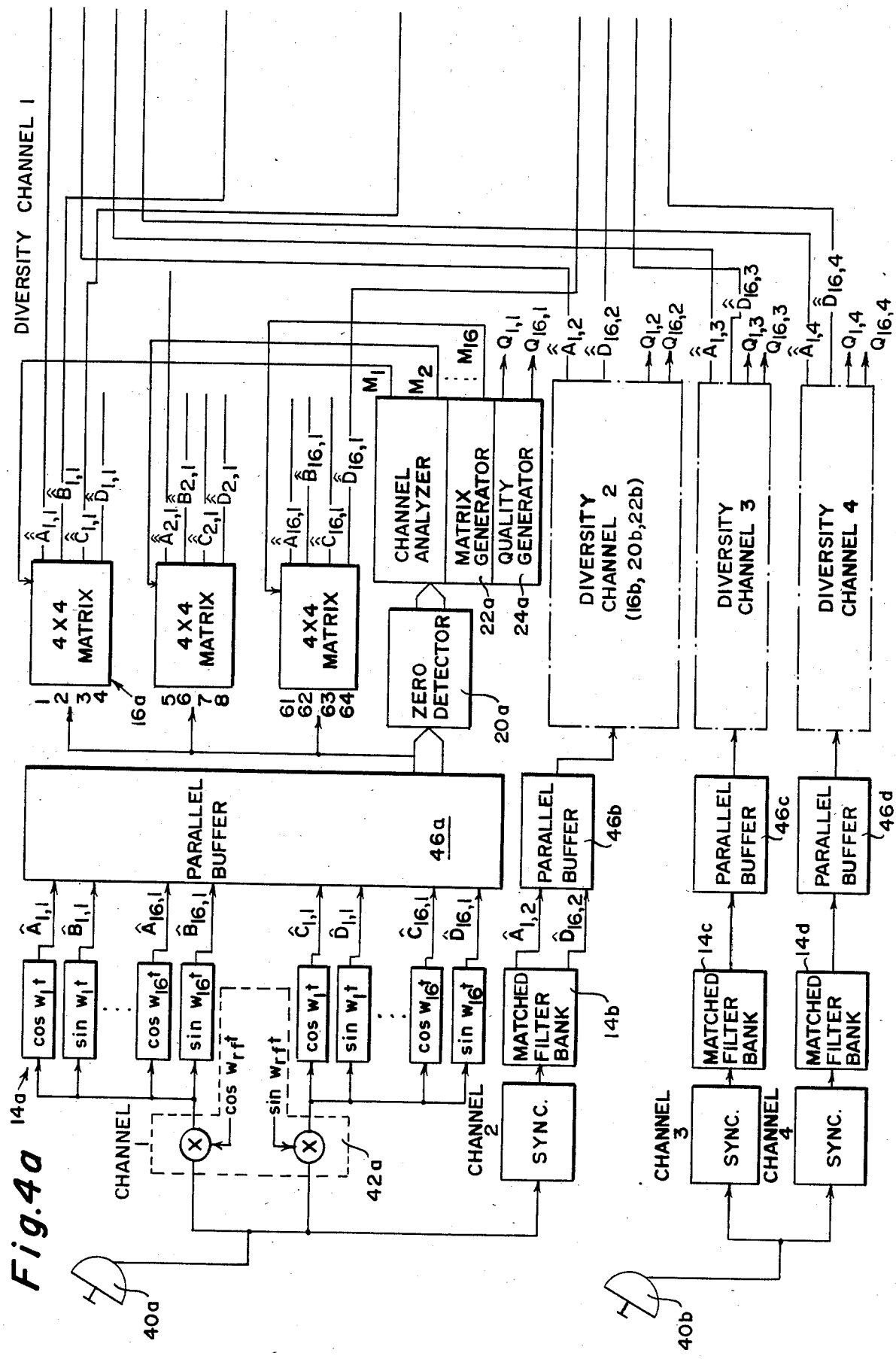

SYSTEM FOR TRANSMITTING DATA THROUGH A TROPOSCATTER MEDIUM

BRIEF DESCRIPTION OF THE PRIOR ART

The present invention relates to an apparatus and method for transmitting and receiving binary data signals in serial form from one station to another through a troposcatter medium.

In the prior binary data transmitting and receiving systems, the transmitted bit information is subjected to distortion and corruption by the troposcatter medium, thereby resulting in waveform distortion and inaccuracies and lapses in the received information.

The present invention was developed to provide an improved transmission and reception system which avoids the drawbacks of the known systems by forming the transmitted signals as a linear sum of a large number of long duration harmonic components, whereby distortion and corruption is greatly reduced.

SUMMARY OF THE INVENTION

Accordingly, a primary object of the present invention is to provide an improved method and system for transmitting binary data in serial form, characterized in that the signal is initially converted to parallel form, and a test signal is periodically introduced into the converted signal, whereupon distinctive sine and cosine harmonics are generated in response to the signal bits, respectively. Equal numbers of the sine and cosine harmonics are contained in two channels (I and Q), the sine and cosine harmonics being arranged in each channel in pairs having harmonic frequencies that differ from the remaining pairs of sine and cosine harmonics in each channel are then added to define two channel signals (I, Q) that are modulated by rf sine and cosine modulating signals, respectively, the resultant modulated signals then being summed and transmitted through the troposcatter medium to the receiver. At the receiver, the received signal is demodulated to form separate channel signals that are supplied to matched filter banks which produce a first set of estimates of the parallel data signals. The test signal is detected from the first set of estimates, and the first set of estimates are supplied to matrix means that are controlled by matrix elements derived from the test signal, thereby to derive a second set of signal estimates having less distortion than the first set.

In accordance with a further object of the invention, diversity is obtained by transmitting a second signal derived by modulating the initial channel signals ($S_I$ and $S_Q$) with rf sine and cosine signals of a different frequency than the first modulating frequency. At the receiver, this second transmitted signal is received and divided into another pair of diversity channels from which the first and second sets of signal estimates are obtained, together with the detected test signal. Summing means for each bit are provided that add diversity components from the four receiver channels, the diversity components being respectively weighted as a function of the test signal, thereby to provide third sets of estimates having less distortion than the second set of estimates.

Among the advantages afforded by the invention are the fact that the use of harmonics permits the intelligence signal to be transmitted through the troposcatter medium more easily, since the signal is altered only in amplitude and phase. Thus, the transmitted signal is composed of a linear sum of a large number of long duration harmonic components, whereby the waveform of the signal is not altered. The intersymbol interference (ISI) is reduced by the fact that each signal component has a long time duration and the ISI is therefore confined to a small percentage of the duration of the signal. Moreover, the signal structure concentrates the spectrum to a well defined pass band, and the signal structure lends itself to a simple straight-forward method of analyzing and correcting the channel distortion. In addition, the system achieves coding gain and groups the errors into a small number of coding symbols, which thereby improves the coding gain.

The signal structure affords the capability of combining on a frequency-selective basis, thereby allowing the use of parts of each diversity channel which have an undistorted spectrum, and which ignore the parts of the channel which are corrupted.

BRIEF DESCRIPTION OF THE DRAWINGS

Other objects and advantages of the invention will become apparent from the study of the following specification, when viewed in the light of the following drawings, in which.

DETAILED DESCRIPTION

Figure 1:
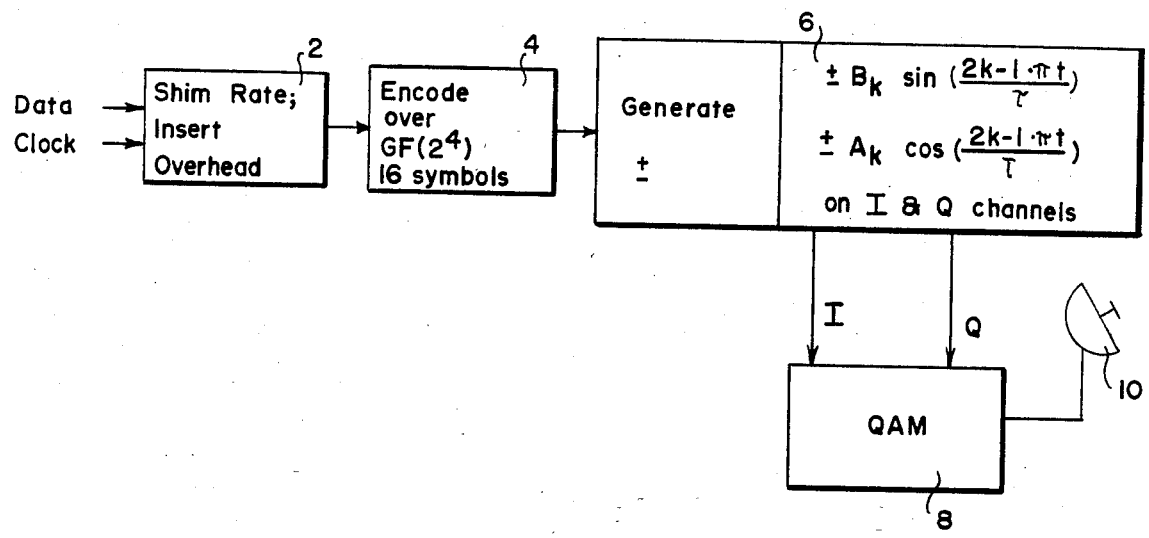
FIG. 1 is a simplified block diagram of the encoder and transmitter means of the present invention.

Referring first more particularly to FIG. 1, the binary data signal in serial form and a clock signal are fed to a data handling means 2 which inserts overhead and produces an appropriate clock rate for the resulting bit stream which is supplied to the encoder 4. The overhead is used to insert known symbols every $k^{th}$ band, and the encoder adds parity check symbols over GF($2^4$) (i.e., over Galois Field($2^4$)). The harmonic generator 6 transforms encoder output into harmonics of the form:

$$\pm B \sin\left(\frac{2k-1 \cdot \pi t}{\tau}\right) \pm A\left(\frac{\cos 2k - 1 \cdot \pi t}{\tau}\right)$$

which are supplied over both the I and Q channels to the quadrature modulator 8 the rf output of which is transmitted through the troposcatter media by the transmitter 10.

Figure 2:
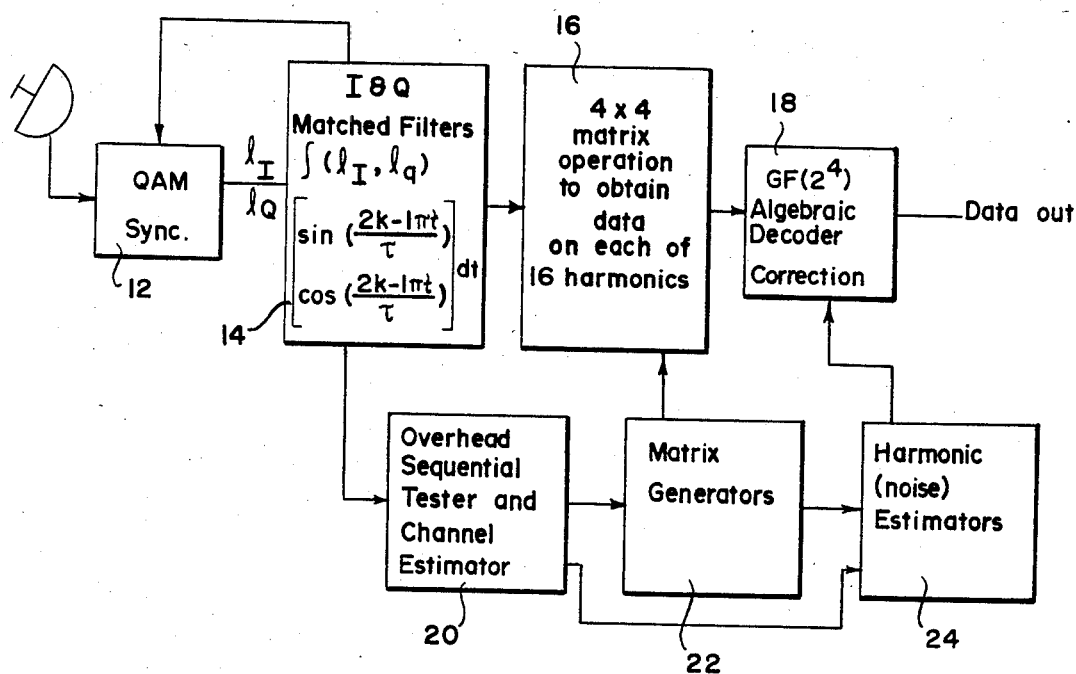
FIG. 2 is a block diagram of the receiver and decoder of the present invention.

At the receiver illustrated in FIG. 2, the synchronizer 12 extracts the average phase, thereby leaving varying phase shifts and gains on each harmonic. The channel is monitored by transmitting known data. The I and Q signals supplied to the matched filter bank 14 are sampled to give raw data estimates that are supplied to the inputs of sixteen 4×4 matrix means 16 to produce output signals with reduced distortion. The mean square noise output can be obtained from the trace (the sum of the diagonals) of this matrix times its transpose. If this noise is too large, we consider the harmonic erased or faded. The faded channels are then filled in by means of the code and error correcting system of the present invention. The algebraic decoder 18 uses the parity symbols in the output of the matrix means 16 to correct errors and to fill in erasures to produce a more error-free output data. Detecting means 20 detects the test signal and produces channel estimated signals which are supplied to the matrix generating means 22 and to the harmonic noise estimators 24.

Considering now the sine and cosine modulation on the I and Q channels, at the transmitter on the I channel there are provided the A B C D coefficients:

$$A \sin w_1 t \cos w_o t \rightarrow \frac{A}{2} [\sin(w_1 + w_o)t - \sin(w_o - w_1)t] \quad (1)$$

and $$B \cos w_1 t \cos w_o t \rightarrow \frac{B}{2} [\cos(w_1 + w_o)t + \cos(w_o - w_1)t] \quad (2)$$

while on the Q channel we have:

$$C \sin w_1 t \sin w_o t \rightarrow \frac{C}{2} [\cos(w_o - w_1)t - \cos(w_o + w_1)t] \quad (3)$$

and $$D \cos w_1 t \sin w_o t \rightarrow \frac{D}{2} [\sin(w_o + w_1)t + \sin(w_o - w_1)t] \quad (4)$$

where $w_1$ is used as one modulating frequency, and $w_o$ is used as the carrier and zero phase reference is assumed without loss of generality. A, B, C, D are equal in magnitude but are modulated in polarity by the data.

At the receiver, the two sidebands are phase shifted and their magnitudes are changed independently of each other. The result is cross talk between sine-cosine and I, Q channels, but if $$w_1 = \frac{(2k - 1)\pi}{\tau}$$

there will be essentially no other crosstalk.

That is, the inputs and outputs of the troposcatter medium are denoted by:

$$\sin(w_o - w_1)t \rightarrow \alpha \sin[(w_o - w_1)t + \theta]$$

$$\cos(w_o - w_1)t \rightarrow \alpha \cos[(w_o - w_1)t + \theta]$$

$$\sin(w_o + w_1)t \rightarrow \beta \sin[(w_o + w_1)t + \phi]$$

$$\cos(w_o + w_1)t \rightarrow \beta \cos[(w_o + w_1)t + \phi] \quad (5)$$

where $\alpha$, $\beta$ represent independent magnitudes, and $\theta$ and $\phi$ are independent phase deviations from the mean phase.

The net down conversion terms on the I channel read:

$$I_I = \propto [A \sin(w_1 t - \theta) + B \cos(w_1 t - \theta)] + \beta[A \sin(w_1 t + \phi) + \quad (6)$$

$$B \cos(w_1 t + \phi)] + \propto [C \cos(w_1 t - \theta) -$$

$$D \sin(w_1 t - \theta)] + \beta[-C \cos(w_1 t + \phi) + D \sin(w_1 + \phi)]$$

The down conversion terms on the Q channels are given by the $\pm 90° \phi$ shifted version of equation (6).

$$I_q = \propto [-A \cos(w_1 t - \theta) + B \sin(w_1 t - \theta)] + \quad (7)$$

$$\beta[A \cos(w_1 t + \phi) - B \sin(w_1 t + \phi)] + \propto [+ C \sin(w_1 t - \theta) +$$

$$D \cos(w_1 - \theta)] + \beta[C \sin(w_1 + \phi) + D \cos(w_1 t + \phi)]$$

Using trigonometric identities, equations (6) and (7) are converted into the form $$I_I = K_1[A \sin(w_1 t + \alpha') + B \cos(w_1 t + \alpha')] + \quad (8)$$

$$K_2[D \sin(w_1 t + \delta) - C \cos(w_1 t + \delta)]$$

and $$I_q = K_1[C \sin(w_1 t + \alpha') + D \cos(w_1 t + \alpha')] + \quad (9)$$

$$K_2[-B \sin(w_1 t + \delta) + A \cos(w_1 t + \delta)]$$

where $$K_1 = \alpha^2 + \beta^2 + 2\alpha\beta \cos(\phi + \theta) \quad (10)$$

$$K_2 = \alpha^2 + \beta^2 - 2\alpha\beta \cos(\phi + \theta)$$

$$\alpha' = \tan^{-1}[(\beta \sin\phi - \alpha \sin\theta)/(\beta \cos\phi + \alpha \cos\theta)]$$

$$\delta = \tan^{-1}[(\beta \sin\phi + \alpha \sin\theta)/(\beta \cos\phi - \alpha \cos\theta)]$$

Note the special case of linear phase $\phi = -\theta$ and $\alpha = \beta$, producing the undistorted QAM $K_2 = 0$,
$\alpha' = \phi$ and $$I_I = K_1[A \sin w_1 t + B \cos w_1 t]$$

$$I_Q = K_1[C \text{ som } w_1 t + D \cos w_1 t] \quad (11)$$

The channel is sampled with overhead by occasionally transmitting known data.

At the receiver the four quantities are measured:

$$x_1 = \frac{2}{\tau} \int_0^T I_I \cos w_1 t \, dt$$

$$x_2 = \frac{2}{\tau} \int_0^T I_I \sin w_1 t \, dt$$

$$x_3 = \frac{2}{\tau} \int_0^T I_q \cos w_1 t \, dt$$

$$x_4 = \frac{2}{\tau} \int_0^T I_q \sin w_1 t \, dt$$

From these measurements, one can easily determine the required channel parameters asuming A, B, C, D are known. A sequential test will determine if one is looking at the overhead bits. Once knowing the parameters of (10) all estimates of A, B, C, D in future bauds are obtainable by matrix operations on the received data, the $\{\chi_i\}$. These operations will be described below, as well as a method of estimating the noise and overall reliability of each individual harmonic.

To obtain the data A, B, C, D from the measured quantities [x] of equation (12), there is required simple matrix multiplication, [a]=Z [x]. (Here [a] is the column vector of A, B, C, D.) To estimate the noise output, one need only look at the trace of $Z^T Z$. Z is a slowly varying matrix which need only be updated at the rate of the multipath channel (circa 30 hz). There is one Z for every harmonic. Because of their structure, the matrix inversions and channel estimators are easy to determine.

DETERMINING THE CHANNEL AND THE Z MATRICIES

The (x) quantities of (12) can be determined with the aid of (8) and (9)

$$x_1 = A K_1 \frac{2}{T} \int_0^T \sin(w_1 t + \alpha') \cos w_1 t \, dt \qquad (13)$$

$$B K_1 \frac{2}{T} \int_0^T \cos(w_1 t + \alpha') \cos w_1 t \, dt +$$

$$D K_2 \frac{2}{T} \int_0^T \sin(w_1 t + \delta) \cos w_1 t \, dt -$$

$$C K_2 \frac{2}{T} \int_0^T \cos(w_1 t + \delta) \cos w_1 t \, dt$$

or $$x_1 = A K_1 \sin\alpha' + B K_1 \cos\alpha' + D K_2 \sin\delta - C K_2 \cos\delta$$

and similarly $$x_2 = A K_1 \cos\alpha' - B K_1 \sin\alpha' + D K_2 \cos\delta + C K_2 \sin\delta \qquad (14)$$

$$x_3 = C K_1 \sin\alpha' + D K_1 \sin\alpha' - B K_2 \sin\delta + A K_2 \cos\delta$$

$$x_4 = C K_1 \cos\alpha' - D K_1 \sin\alpha' - B K_2 \sin\delta - A K_2 \sin\delta$$

It is to be noted from equation (14) that the equations are not only linear in A, B, C, D but also linear in $K_1 \sin\alpha'$, $K_1 \cos\alpha'$, $K_2 \sin\delta$, $K_2 \cos\delta$.

Equation (14) can be written in matrix notation $$\begin{bmatrix} A & B & D & -C \\ -B & A & C & +D \\ C & D & -B & A \\ -D & C & -A & -B \end{bmatrix} \begin{bmatrix} K_1 \sin\alpha \\ K_1 \cos\alpha \\ K_2 \sin\delta \\ K_2 \cos\delta \end{bmatrix} = \begin{bmatrix} x_1 \\ x_2 \\ x_3 \\ x_4 \end{bmatrix}$$

Furthermore, the test signals are easily chosen so that the matrix on the LHS of (15) is orthogonal or Haddamard, and its inverse is simply a constant ¼ times its transpose. One example is $A = B = C = \pm 1$.

That is, for the appropriate choice of test signals, one can write the channel estimates remarkably simply $$\begin{bmatrix} K_1 \sin\alpha' \\ K_1 \cos\alpha' \\ K_2 \sin\delta \\ K_2 \cos\delta \end{bmatrix} = \pm \frac{1}{4} \begin{bmatrix} 1 & -1 & 1 & -1 \\ 1 & 1 & 1 & 1 \\ 1 & 1 & -1 & -1 \\ -1 & 1 & 1 & -1 \end{bmatrix} \begin{bmatrix} x_1 \\ x_2 \\ x_3 \\ x_4 \end{bmatrix} \qquad (16)$$

Their estimates are averaged over several samples.

Once having determined the quantites on the LHS of (16), the A, B, C, D of (14) are obtained by inverting another matrix which is particularly simple to invert. Writing (14) in matrix notation:

$$\begin{bmatrix} K_1 \sin\alpha' & K_1 \cos\alpha' & -K_2 \cos\delta & K_2 \sin\delta \\ K_1 \cos\alpha' & -K_1 \sin\alpha' & K_2 \sin\delta & K_2 \cos\delta \\ K_2 \cos\delta & -K_2 \sin\delta & K_1 \sin\alpha' & K_1 \cos\alpha' \\ -K_2 \sin\delta & -K_2 \cos\delta & K_1 \cos\alpha' & -K_1 \sin\alpha' \end{bmatrix} \begin{bmatrix} A \\ B \\ C \\ D \end{bmatrix} = \begin{bmatrix} x_1 \\ x_2 \\ x_3 \\ x_4 \end{bmatrix} \qquad (17)$$

or $$Y[a] = [x] \qquad (17a)$$

One needs now to invert matrix on the LHS of (17). The rows of (17) are almost all orthogonal. Orthogonality fails only in the first dotted into the fourth and the second dotted into the third.

Thus $$YY^T = (K^2 + K^2) \begin{bmatrix} 1 & 0 & 0 & -f \\ 0 & 1 & +f & 0 \\ 0 & +f & 1 & 0 \\ -1 & 0 & 0 & 1 \end{bmatrix} \qquad (18)$$

where $f = \frac{2K_1 K_2}{K^2 + K^2} [\cos\alpha' \cos\delta + \sin\alpha' \sin\delta]$ (19a)

$$= \frac{2K_1 K_2}{K^2 + K^2} [\cos(\alpha' - \delta)] \qquad (19b)$$

with a few column operations the matrix on the RHS of (18) is easily inverted: call it $H^{-1}$, then the desired inverse is expressed $$Y^{-1} = Z = Y^T H^{-1} \qquad (20)$$

ESTIMATING THE NOISE

Once having established the formula for the data in the form $$a = Zx \qquad (21)$$

one needs to know the reliability of the estimate of a. Independent noise is added to each entry in x. Furthermore, in white noise background each entry has the same rms value.

Now the noise in the "a vector" reads $$n_a = Z n_x \qquad (22)$$

and its mean square value is $$\overline{n^T n_a} = \overline{n^T Z^T Z n_x} \qquad (23)$$

Expanding $n_x$ in normalized eigenvectors $U_j$ of $Z^T Z$, one obtains $$n_x = \Sigma C_j U_j \qquad (24)$$

$$\overline{n^T n_a} = \overline{\Sigma C_i U_i^T \Sigma C_j \lambda_j U_j}$$

$$= \Sigma \lambda_j \overline{C_j^2} = \delta^2 \Sigma \chi$$

since $U^T U_j = 0 \ i \neq j$
$= 1 \ i = j$

Now $\overline{C_j^2}$ is the same for all j since the noise power is the same in each component. The multiplying factor for the noise is therefore simply $$\sum_{j=1}^{4} \lambda_j,$$

or trace $Z^T Z$.

These traces will be used to determine which harmonic has faded. We suspect that the traces are simple functions of $K_1 \sin \alpha'$, $K_1 \cos \alpha'$, $K_2 \sin \delta$ and $K_2 \cos \delta$.

Figure 3:
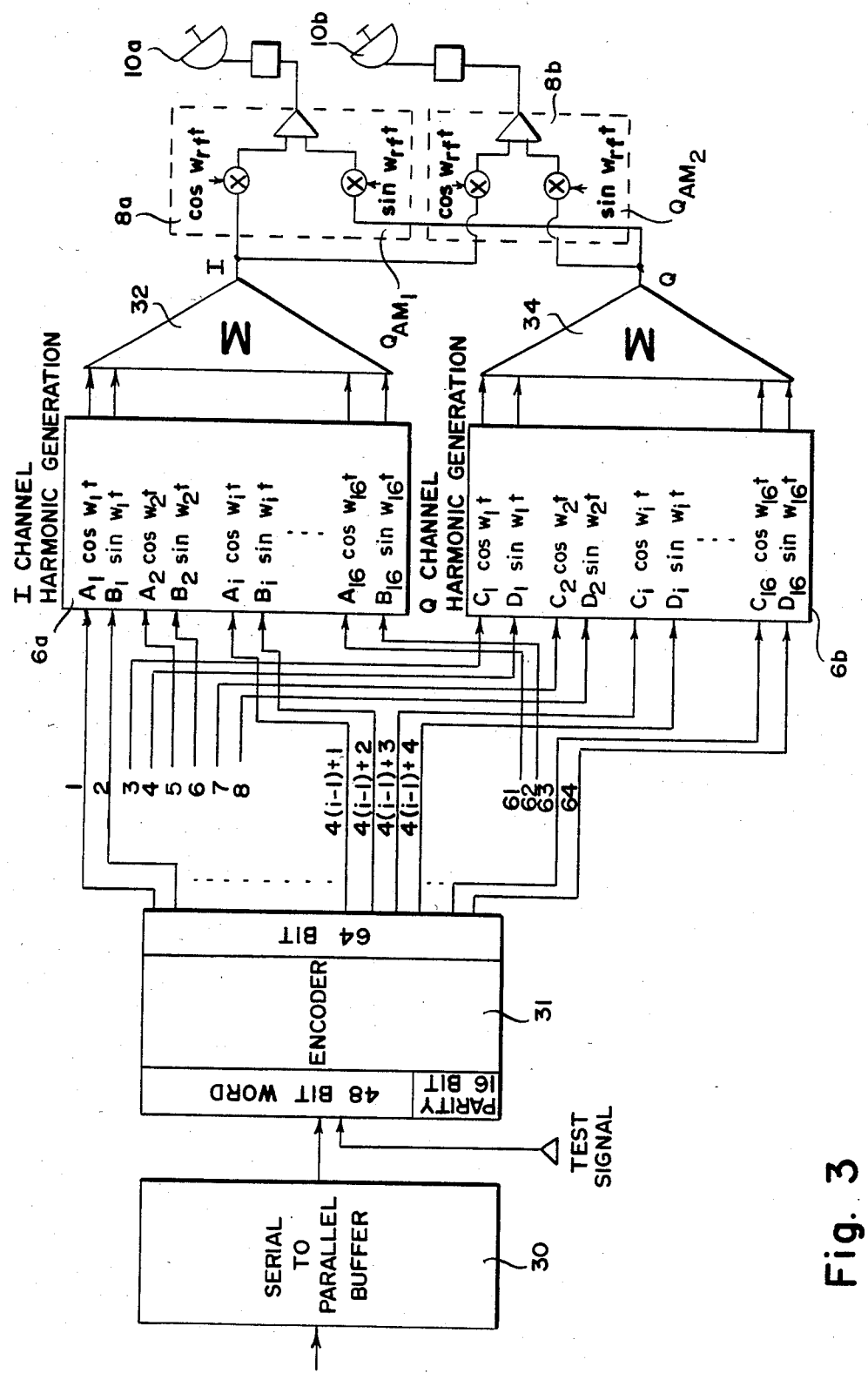
FIGS. 3 and 4 are detailed block diagrams of the systems of FIGS. 1 and 2, respectively.

Referring now to FIG. 3, the input data is supplied to the serial to parallel buffer 30 and is supplied to the encoder 31, whereupon the 48 bit input word is converted to a 64 bit output word by adding a 16 bit parity signal. A test signal is inserted into the buffer for distortion control at the receiver as will be discussed below.

The encoder outputs are connected with the harmonic generators, respectively, of the harmonic generating means 6, half of the harmonic generators being grouped in channel I, and the remainder being grouped in channel Q. In each channel, half of the harmonic generators are sine generators, the remainder being cosine generators. The sine and cosine generators in one channel are associated in pairs having different harmonic frequencies, respectively, the sine and cosine generators of the other channel being associated in pairs having frequencies, respectively, that correspond with those of the first channel.

The outputs from the I channel harmonic generator means 6a are added by summing means 32, and the outputs from the Q channel harmonic generator means 6b are added by the summing means 34. The resulting Q and I outputs are supplied to the inputs of the ref modulators 8a and 8b, thereby to obtain diversity of the rf signals transmitted by the transmitters 10a and 10b, respectively. In the modulators 8a and 8b, the I and Q signals are modulated by the $\cos w_{rf}t$ (thereby to obtain quadrature modulation Q AM).

Figure 4B:
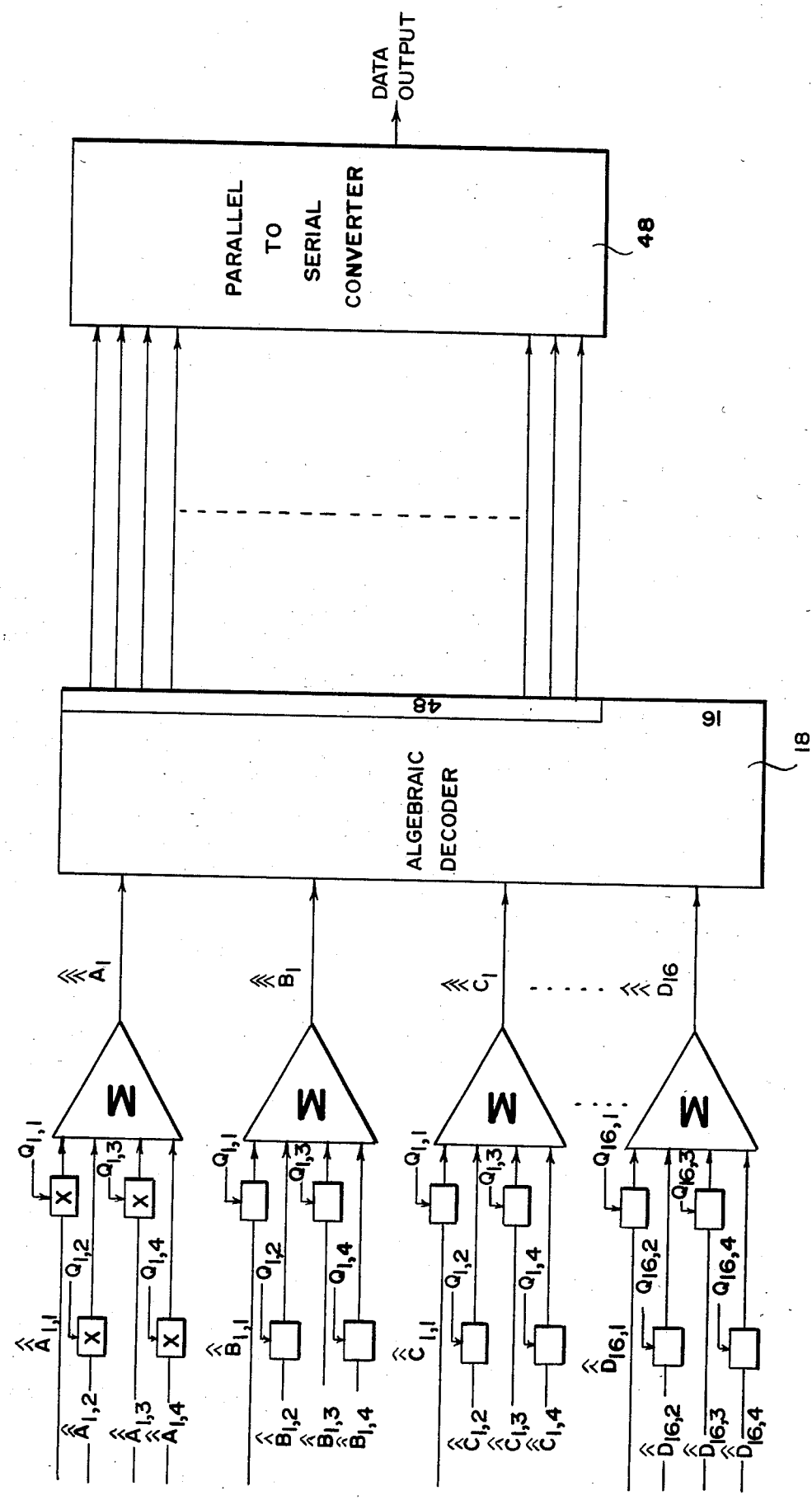

Referring now to FIG. 4, at the receiver, the signals transmitted by the transmitters 10a and 10b are received by two antennas 40a and 40b that receive the transmitted signals and apply the same to the inputs of synchronizers 42a, 42b, 42c and 42d for channels 1 and 2 and channels 3 and 4, respectively. Each synchronizer removes the carrier modulation by means of demodulating signals $\cos w_{rf}t$ and $\sin w_{rf}t$, thereby generating signals I and Q that are applied to the associated matched filter bank 14a, 14b, 14c, 14d, thereby to produce sampled first estimate signals $\widehat{A}_{1,1} \ldots \widehat{D}_{16,4}$. These first estimate signals are buffered by buffers 46a, 46b, 46c, 46d which separate from the signals the test signals detected by the detectors 20a, 20b, 20c, 20d. The data signals from each buffer are transmitted to the associated 4 by 4 matrix operations 16a, 16b, 16c, 16d, which are determined by matrix generator signals produced from the recovered test signals by the matrix generators 22a, 22b, 22c, 22d, respectively. The outputs $\widehat{\widehat{A}}_{1,1} \ldots \widehat{\widehat{D}}_{16,4}$ from the matrix operations define second signal estimates having lower distortion or corruption than the first signal estimates. These second signal estimates are then supplied to diversity channel weighting device 46 which, in accordance with the test signals, produce third sets of signal estimates $\widehat{\widehat{\widehat{A}}}_{1,1} \ldots \widehat{\widehat{\widehat{D}}}_{16,4}$ which have lower distortion or corruption than the second estimate signals. The weighting of the second estimate bits is determined by the formula:

$$\widehat{\widehat{\widehat{A}}}_i = \sum_{j=1}^{4} \widehat{\widehat{A}}_{ij} Q_{ij}$$

$$\widehat{\widehat{\widehat{B}}}_i = \sum_{j=1}^{4} \widehat{\widehat{B}}_{ij} Q_{ij}$$

-continued $$\widehat{\widehat{\widehat{C}}}_i = \sum_{j=1}^{4} \widehat{\widehat{C}}_{ij} Q_{ij}$$

$$\widehat{\widehat{\widehat{D}}}_i = \sum_{j=1}^{4} \widehat{\widehat{D}}_{ij} Q_{ij} \quad i = 1, \ldots, 16$$

where:

$$Q_{ij} = \frac{1 \left[ \sum_{j=1}^{4} \frac{1}{\text{Trace}[Z_{ij}^T Z_{ij}]} \right]}{\text{Trace}[Z_{ij}^T Z_{ij}]}$$

$i =$ harmonic frequency number $1 \leq i \leq 16$
$j =$ diversity channel number $1 \leq j \leq 4$ In the above formula, $Z_{ij}$ is the same as in equation (20) above, where the subscript 6 designates the harmonic frequency, and j designates the diversity channel. These low-distortion third estimate signals are decoded by the algebriac decoder 18, and are reconverted back to serial form by the parallel to serial converter 48.

Figure 5:
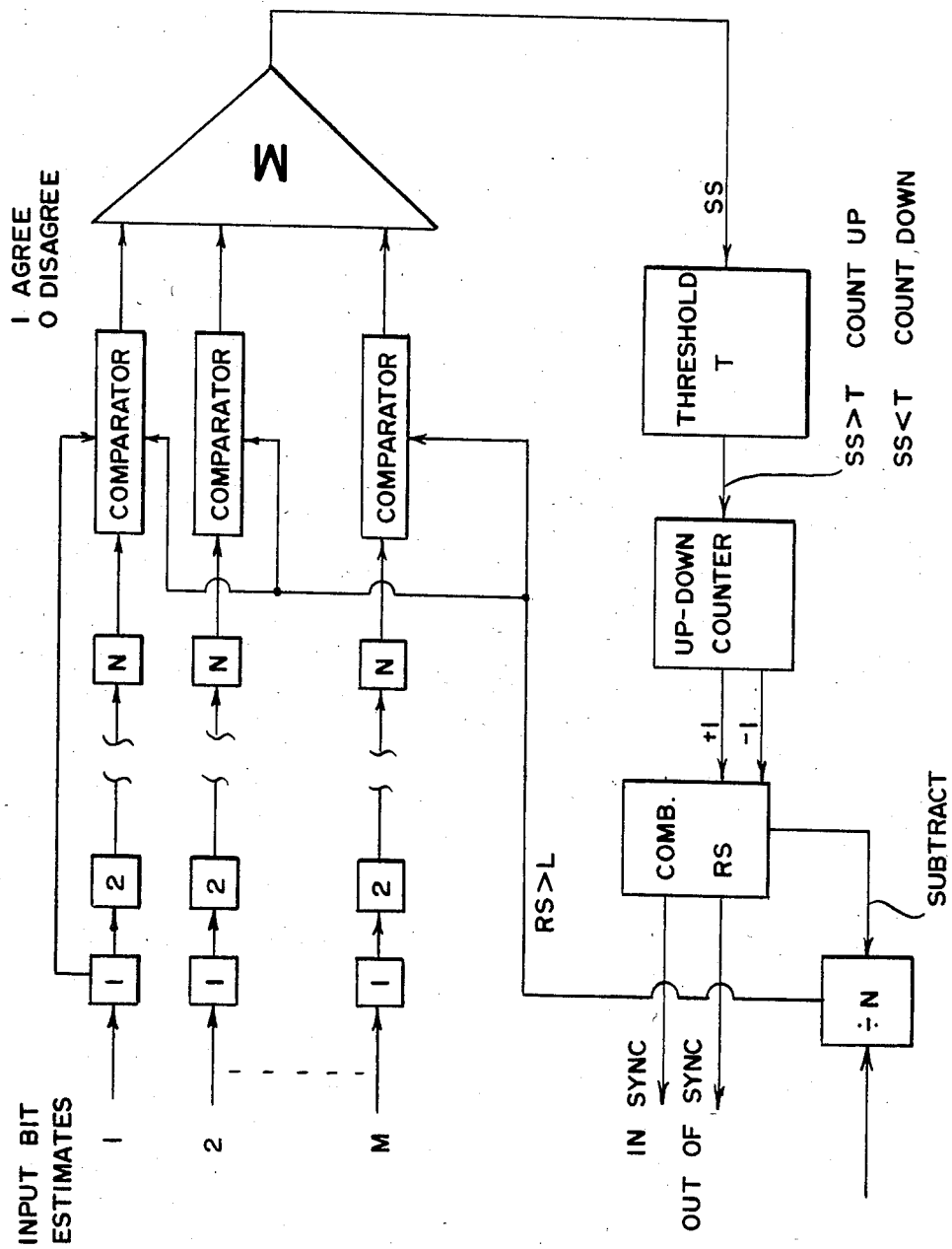
FIG. 5 is a block diagram of the test signal detecting means.

Referring now to FIG. 5, the test signal synchronizer compares the symbols occuring N intervals apart, the parallel input stream being fed into a bank of M parallel shift registers which are N bits long. At the position which is being tested as a sync point the bits are compared with the bits arriving N bits earlier. If the number of agreements is greater than some threshold number T, then the sync counter is counted up. If the number of agreements is below the threshold T then the in sync counter is counted down. If the counter exceeds an upper limit $U_L$ then it is decided that the synchronization point has been found and the system is declared to be in sync. If the sync counter goes below the lower limit L the sytem is declared to be out of sync and the system goes to search the next possible sync point and the sync counter is reset to zero. The system is moved to search the next sync point simply by inhibiting one count to the divide-by-N counter which determines which point is being tested as the possible sync point.

The probability of falsely accepting a wrong position as the sync point can be made arbitrarily small by making $L_u$ large. Likewise, the probability of falsely rejecting the right sync point can be made arbitrarily small by giving $L_u$ a large negative value. T is set at a level such that the probability of a false in sync reading is equal to the probability of a false out of sync reading. The the in sync counter will count up 1 for an in sync reading and down 1 for an out of sync reading.

With this approach the system can be designed so that the average time to false loss of the sync can be made astronomical, while the average time to detect a loss of sync is quite small.

We claim:
1. Apparatus for transmitting and receiving binary data signals in serial form from one station to another through a troposcatter medium, comprising
   (a) means for converting the serial data signals to parallel data signals;
   (b) means for periodically inserting a channel test signal into said parallel data signals;

(c) means for generating sine and cosine harmonics for first and second groups of said parallel data signals, respectively, half of each of said sine and cosine harmonics generators being contained in one channel (I) and the remaining sine and cosine harmonics generators being contained in another channel (Q), each pair of sine and cosine harmonics generators in a given channel having a different harmonic frequency ($w_1 - w_{16}$), respectively, corresponding pairs of sine and cosine harmonics generators in the other channel having corresponding harmonic frequencies, respectively;

(d) means for adding the sine and cosine harmonics for each channel, thereby to define respective channel signals ($S_I$, $S_Q$);

(e) means for modulating said channel signals with radio frequency cosine and sine modulating signals, respectively, and for adding the cosine and sine modulated signals, thereby to produce resultant rf signals;

(f) means for transmitting said resultant rf signals; and (g) means for receiving said transmitted signal and for reproducing therefrom the original binary data signals.

2. Apparatus as defined in claim 1, wherein said receiver means comprises (1) demodulator means for deriving from the received signal the separate channel signals ($S_I$, $S_Q$), respectively;

(2) means including a plurality of matched filters for generating from the channel signals a first set of estimates ($\widehat{A}_{1,1} \ldots \widehat{D}_{16,1}$) of the parallel data signals, respectively;

(3) means responsive to the test signal contained in the transmitted signal for removing medium distortion from said first signal estimates; thereby to define a second set of signal estimates ($\widehat{A}_{1,1} \ldots \widehat{D}_{16,1}$) having less distortion than said first set of signal estimates; and (4) means for converting the signal estimates to binary data signals in serial form.

3. Apparatus as defined in claim 2, wherein said distortion removing means comprises (a) a plurality of matrix multiplication means corresponding with different harmonic frequencies, respectively, said matrix means having first input terminals to which said first signal estimates are supplied, respectively; and (b) first means responsive to the test signal contained in the transmitted signal for supplying matrix element signals to second input terminals of said matrix means, thereby to produce said second set of signal estimates at the matrix output terminals.

4. Apparatus as defined in claim 3, wherein a plurality of diversity resultant signals are transmitted and received, respectively; and further wherein said distortion removing means also includes (c) second means responsive to the testing signals contained in said diversity resultant signals for producing a third set of signal estimates ($A_1 \ldots D_{16}$) having less distortion than said second second set of signal estimates.

5. Apparatus as defined in claim 4, wherein said second means comprises (1) means for weighting the corresponding bits of each diversity channel; and (2) means for summing the weighted diversity channel signal bits to produce said third signal estimate.

6. Apparatus as defined in claim 5, wherein said weighting means includes matrix means operable in accordance with the formula:

$$Q_{ij} = \frac{1\left[\sum_{j=1}^{4} \frac{1}{\text{Trace}[Z_{ij}^T Z_{ij}]}\right]}{\text{Trace}[Z_{ij}^T Z_{ij}]}$$

where $i$ = harmonic frequency number $1 \leq i \leq 16$
$j$ = diversity channel number $1 \leq j \leq 4$.

7. The method for transmitting and receiving binary data signals in serial form from one station to another through a troposcatter medium, comprising the steps of (a) converting the serial data signals to parallel data signals;

(b) periodically inserting a channel test signal into said parallel data signals;

(c) generating sine and cosine harmonics for first and second groups of said parallel data signals, respectively, half of each of said sine and cosine harmonics generators being contained in one channel (I) and the remaining sine and cosine harmonics generators being contained in another channel (Q), each pair of sine and cosine harmonics generators in a given channel having a different harmonic frequency ($w_1 - w_{16}$), respectively, corresponding pairs of sine and cosine harmonics generators in the other channel having corresponding harmonic frequencies, respectively;

(d) adding the sine and cosine harmonics for each channel, thereby to define respective channel signals ($S_I$, $S_Q$);

(e) modulating said channel signals with radio frequency cosine and sine modulating signals, respectively, and for adding the cosine and sine modulated signals, thereby to produce resultant signals;

(f) transmitting said resultant rf signals; and (g) receiving said transmitted signal and reproducing therefrom the original binary data signals.

8. The method defined in claim 7, wherein said receiving step comprises the further steps of (1) demodulating the received signal to derive the separate channel signals ($S_I$, $S_Q$), respectively;

(2) generating from the channel signals by matched filter means a first set of estimates ($\widehat{A}_{1,1} \ldots \widehat{D}_{16,1}$) of the parallel data signals, respectively;

(3) removing medium distortion from said first signal estimates in response to the test signal; thereby to define a second set of signal estimates ($\widehat{A}_{1,1} \ldots \widehat{D}_{16,1}$) having less distortion than the first set of estimates; and (4) converting the signal estimates to binary data signals in serial form.

9. The method defined in claim 8, wherein said distortion removing step comprises (a) providing a plurality of matrix multiplication means corresponding with different harmonic frequencies, respectively, said matrix means having first input terminals to which said first signal estimates are supplied, respectively; and (b) supplying to second input terminals of said matrix means to the test signal, thereby to produce said second set of signal estimates at the matrix output terminals.

10. The method defined in claim 9, wherein a plurality of diversity resultant signals are transmitted and received, respectively; and further wherein said distortion removing step also includes (c) providing second means responsive to the test signals contained in said diversity resultant signals for producing a third set of signal estimates ($\tilde{\tilde{A}}_1 \ldots \tilde{\tilde{D}}_{16}$) having less distortion than said second set of signal estimates.

11. The method as defined in claim 10, wherein said second means is operable (1) for weighting the corresponding bits of diversity channel; and (2) for summing the weighted diversity channel signal bits to produce said third signal estimate.

12. The method as defined in claim 11, wherein said weighting step includes providing matrix means operable in accordance with the formula;

$$Q_{ij} = \frac{1\left[\sum_{j=1}^{4} \frac{1}{\text{Trace}[Z_{ij}^T Z_{ij}]}\right]}{\text{Trace}[Z_{ij}^T Z_{ij}]}$$

where $i$ = harmonic frequency number $1 \leq i \leq 16$
$j$ = diversity channel number $1 \leq j \leq 4$.

* * * * *